United States Patent [19]

Loonen et al.

[11] Patent Number: 5,361,126
[45] Date of Patent: Nov. 1, 1994

[54] TONER IMAGE TRANSFER APPARATUS INCLUDING INTERMEDIATE TRANSFER MEDIUM

[75] Inventors: Hubertus A. M. Loonen, Haps; Mark Miedema, Velden; Bauke Schoustra, Velden; Joannes A. Verbunt, Velden; Eduardus H. A. M. Smit, Venlo, all of Netherlands

[73] Assignee: OCE-Nederland, B.V., Venlo, Netherlands

[21] Appl. No.: 93,639

[22] Filed: Jul. 20, 1993

[30] Foreign Application Priority Data

Jul. 27, 1992 [NL] Netherlands .......................... 9201347

[51] Int. Cl.⁵ ...................... G03G 15/12; G03G 15/14
[52] U.S. Cl. ...................................... 355/279; 355/271
[58] Field of Search ............... 355/271, 273, 277, 279, 355/281–285, 290; 430/124, 126; 219/216

[56] References Cited

U.S. PATENT DOCUMENTS

| | | | |
|---|---|---|---|
| 2,990,278 | 6/1961 | Carlson | 355/281 X |
| 4,233,397 | 11/1980 | Till | 355/279 |
| 4,435,067 | 3/1984 | Draai et al. | 355/277 |
| 4,453,820 | 6/1984 | Suzuki | 355/279 |
| 4,607,947 | 8/1986 | Ensing et al. | 355/283 |
| 4,657,373 | 4/1987 | Winthaegen et al. | 355/275 |
| 4,910,558 | 3/1990 | Giezeman et al. | 355/279 |

OTHER PUBLICATIONS

European Search Report.
Xerox disclosure Journal 13(5), 1988, pp. 265–266.
IBM Technical Disclosure Bulletin 24(8), 1982, pp. 4166–4167.

*Primary Examiner*—A. T. Grimley
*Assistant Examiner*—William J. Royer
*Attorney, Agent, or Firm*—Birch, Stewart, Kolasch & Birch

[57] ABSTRACT

An imaging apparatus including a transferring device for transferring a toner image from an image-forming medium to a receiving material, comprising an endless movable intermediate provided with a top layer which in a first transfer zone is in contact with the image-forming medium, heater for heating the toner image on the top layer of the intermediate, a pressure applying roller which in a second transfer zone can be brought into contact with the intermediate, a transport roller for transporting the receiving material through the second transfer zone, wherein removal of impurities transferred by receiving materials to the top layer of the intermediate is realized by absorption of the impurities by an impurity-absorbent material within the intermediate.

15 Claims, 2 Drawing Sheets

TONER IMAGE TRANSFER APPARATUS INCLUDING INTERMEDIATE TRANSFER MEDIUM

BACKGROUND OF THE INVENTION

1. Field of the Invention

The present invention relates to an electrostatic imaging system and, more specifically, to an apparatus for transferring a toner image from an image-forming medium to a receiving material via an intermediate transfer medium and for cleaning the intermediate transfer medium.

2. Discussion of Related Art

U.S. Pat. No. 4,607,947 describes a contact fixing apparatus in which a toner image is transferred from an image-forming medium to a heated intermediate. In a fixing zone in which the intermediate is in contact with a pressure applying means, the toner image is then transferred to and simultaneously fixed on a receiving material transported through the fixing zone. However, impurities may also be transferred at the same time from the receiving material to the intermediate. Residues of toner material may also be left as impurities on the intermediate because of incomplete transfer of the toner image to the receiving material. If such impurities remain on the intermediate they may be transferred to the image-forming medium in the first transfer zone. This results in disturbance of the image formation and hence ultimately image errors in the copy on the receiving material.

Various cleaning means have been proposed to remove these impurities from the intermediate before reaching the first transfer zone. For example, U.S. Pat. No. 4,607,947 discloses a cleaning means having a cleaning surface to which toner has better adhesion than to the intermediate. A cleaning means of this kind operates satisfactorily for removing high-melting temperature impurities, such as toner residues. This cleaning means can also remove paper dust from the intermediate, but it has been found in practice that low-melting impurities from receiving materials, such as wax-like compounds, plasticizers, anti-foaming agents, plastic fillers which occur in receiving papers, and dust particles from plastic receiving materials and the like, are removed only partially, if at all, from the intermediate with the known cleaning means. After deposition on the intermediate in the second transfer zone, these impurities can also then be transferred to the image-forming medium in the first transfer zone, resulting in disturbance of the image formation and hence ultimately image errors in the copy on the receiving material. This necessitates regular and premature replacement of the intermediate and image-forming medium, and this involves high maintenance costs and equipment stoppage. For example, it has been found that the "alkaline" receiving papers increasingly used and based, inter alia, on cellulose, chalk and sizing agents such as alkyl ketone dimers, are a significant source of such impurity. Receiving papers of this kind are currently used because of the lower costs and better durability compared with the "acid" receiving papers based, inter alia, on cellulose, clay and modified or unmodified rosins. It has now been found that when such receiving papers are used, reaction products from these binders are deposited from these papers on the intermediate. These reaction products are then transferred to the image-forming medium, resulting in image disturbance.

SUMMARY OF THE INVENTION

Therefore, it is an object of the present invention to provide a toner-image transfer system which will overcome the above-noted disadvantages.

It is a further object of the instant invention to provide an image transfer apparatus which provides for the transfer of toner images to an image-receiving material without the deposition of impurities on the image-forming medium.

Still, a further object of the present invention is to provide a toner image transfer system which substantially eliminates impurity deposits which result in the disturbance of image formation.

The foregoing objects and others are accomplished in accordance with the present invention, generally speaking, by providing an image-forming apparatus including an image-forming medium, means of forming an image on the image-forming medium, a toner image development system and a configuration for transferring the developed toner image from the image-forming medium to a first image-receiving support member or sheet material. The image transfer configuration includes an endless movable intermediate member comprising a support provided with a top layer which is secured by way of its back to a support and which intermediate in a first transfer zone is in contact with the image-forming medium for the purpose of transferring the toner image developed to the surface of the intermediate member. A heating means is provided for heating the transferred toner image now on the top layer of the intermediate member. A pressure applying means is brought into contact with the intermediate member within a second transfer zone. A transport means transports a receiving material through the second transfer zone in which the toner image is transferred to the receiving material. Means are provided for removing from the top layer of the intermediate member by way of the back thereof, impurities which have been transferred to the top layer of the intermediate by receiving materials, removal being as a result of the absorbing of these impurities in an impurity-absorbent material beneath the top layer of the intermediate member. The quantity of impurities in the top layer is reduced, as a result, and deposition of impurities on the image-forming medium is lessened so that the life of the intermediate and the image-forming medium, i.e. the period during which these media can be used without any image errors occurring, is lengthened.

A preferred apparatus is one in which the means for removing impurities transferred to the top layer of the intermediate by receiving materials comprises a layer of impurity-absorbent material applied to the support beneath the top layer. As a result, continuous discharge is possible during stand-by and running periods to remove the impurities from the top layer to the absorbent layer so that the usable life of the intermediate and the period of utility of the image-forming medium are considerably lengthened.

Inter alia, RTV and HTV silicone rubbers are used as the top layer for intermediates. They are obtained by hardening reactive group bearing polyorganosiloxane mixtures, under the influence of a suitable catalyst, at room temperature or at elevated temperature, to produce an elastomeric composition. The top layer may also comprise additives in order to improve its properties such as mechanical strength, thermal conduction and antistatic behavior. Typical rubber compositions for forming a top layer for intermediates which can be used as a temporary support for a powder image, are described in UK patent No. 1,279,687 and Example 1 of European patent application No. 146,980. The intermediate may be in the form of a cylindrical metal roller provided with an impurity-absorbing resilient rubber layer to which a top layer is applied.

Another embodiment is characterized in that the intermediate is in the form of an endless belt which is trained about two or more shafts, and the support is made as a layer of impurity-absorbent material. An intermediate belt of this kind is simple and economical to produce and easy to replace at the end of its life.

A further embodiment is characterized in that the support is constructed as a fabric belt, which fabric belt is provided with a layer of impurity-absorbent material to which a top layer is applied.

A special embodiment of the apparatus according to the invention is characterized in that the impurity-absorbing support on the side facing away from the top layer is contacted with a cleaning device which is provided with an impurity-absorbent material to increase the absorption capacity of the apparatus. In this embodiment the impurities in the top layer are transported rapidly and effectively through the support layer to the cleaning device where they are absorbed. Preferably the cleaning device is provided with a material which irreversibly absorbs the impurities so that carry back of the impurities to the support layer is prevented.

Good cleaning of the intermediate medium is obtained in an apparatus in which the impurity-absorbent material is a rubber material selected from the group consisting of ethylene propylene diene rubber, ethylene propylene rubber, n-butyl rubber, and ethylene vinyl acetate rubber, a mixture of ethylene propylene diene rubber and silicone rubber, and mixtures of these rubbers. Particularly preferred are rubber materials containing more than 5% carbon black selected from the group consisting of ethylene propylene diene rubber, n-butyl rubber, ethylene propylene rubber, ethylene vinyl acetate rubber, silicone rubber and mixtures of these rubbers. Such rubbers are resistant to high temperatures and have sufficient mechanical strength even after long periods of use. A very suitable embodiment is characterized in that the absorbent material consists mainly of silicone rubber obtained by the reaction of an Si—H-group bearing polyorganosiloxane with a polyorganosiloxane which bears Si—(CH=CH$_2$) groups and which on average per polymeric chain contains no more than 1000 monomeric units, bears 1.5–4 terminal vinyl groups, bears no more than one non-terminal vinyl group per 80 monomeric units and contains not more than 2% Si atoms in the form of SIO$_{3/2}$ or SI-O$_{4/2}$ units, which rubber is mixed with at least 10% carbon black having a specific surface greater than 200 m$^2$/g. An absorbent material of this kind has good mechanical properties and adheres excellently to materials such as aluminum and steel, various fabrics and various top layer rubbers. In addition, the absorption capacity for impurities, such as by distearyl ketone, is very good.

BRIEF DESCRIPTION OF THE DRAWINGS

The invention will now be explained with reference to the accompanying drawings, wherein.

DETAILED DISCUSSION OF THE INVENTION

Figure 1:
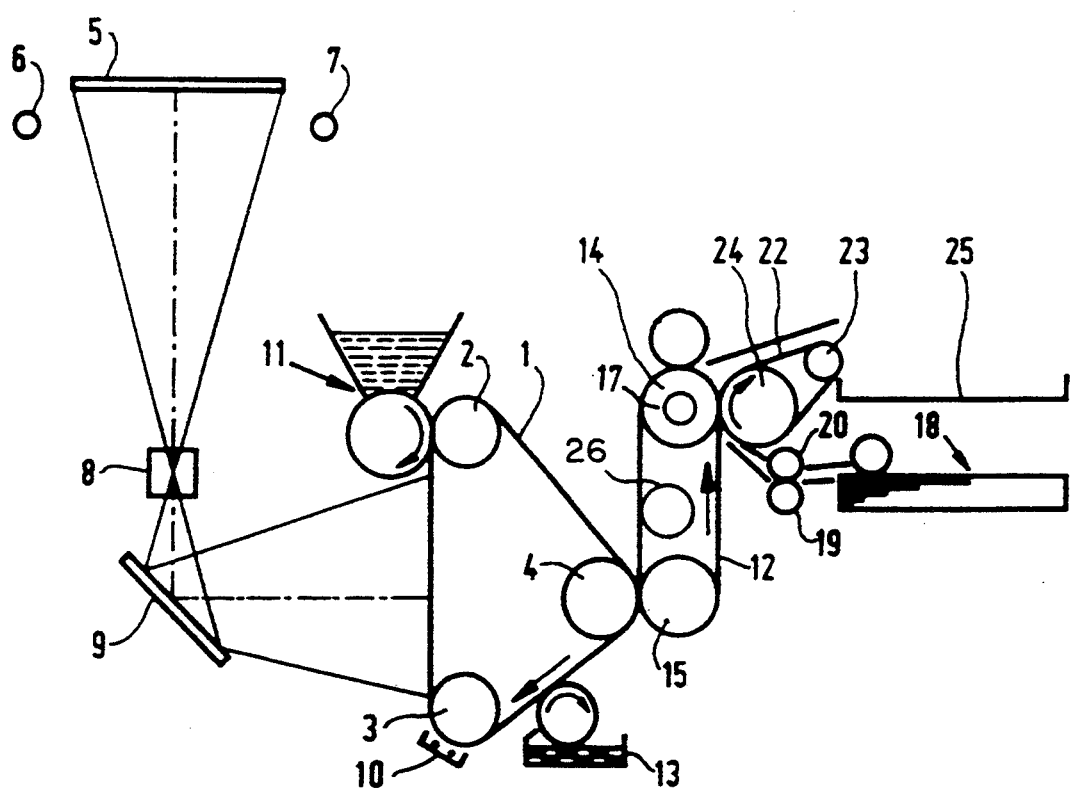
FIG. 1 is a diagrammatic cross-section through one embodiment of the apparatus according to the present invention.

The image-forming apparatus illustrated in FIG. 1 comprises an endless photoconductive belt 1 advanced at uniform speed by means of drive and guide rollers 2, 3 and 4, respectively. The image of an original disposed on an exposure platen 5 is projected by flashlights 6 and 7, a lens 8, and a mirror 9, onto the belt 1 after the latter has been electrostatically charged by a corona device 10. The latent charge image formed on the belt 1 after the flash exposure is developed with toner powder by means of a magnetic brush device 11 to produce a toner image which in a first transfer zone is then brought into contact, under pressure, with an endless intermediate belt 12 provided with a top layer of soft resilient and heat-resistant material such as, for example, silicone rubber. In these conditions the toner image is transferred from the belt 1 to the belt 12 by adhesion forces.

After image transfer, any remaining image residues are removed from belt 1 by means of a cleaning device 13. Thereafter the photoconductive belt 1 is ready for re-use. The intermediate belt 12 is trained about drive and guide rollers or shafts 14 and 15, the intermediate belt 12 being heated to a temperature above the softening temperature of the toner powder, e.g. by means of an infra-red radiator 17 disposed inside roller 14. While belt 12 with the toner image thereon is advanced, the heating causes the toner image to become tacky. In a second transfer zone, under the influence of pressure, using a pressure means in the form of a belt 22 trained about rollers 23 and 24, the tacky toner image is transferred to and simultaneously fixed on a sheet of receiving material which is fed from reservoir 18 via rollers 19 and 20. The resulting copy is then deposited in tray 25 by belt 22 trained about rollers 23 and 24.

Figure 2:
FIG. 2 diagrammatically shows the layer structure of one embodiment of an intermediate belt usable in an apparatus according to the invention.

The intermediate belt 12 according to FIG. 2 is in the form of a polyester fabric belt 40 provided with a 2 mm thick layer of peroxide hardened silicone rubber 41 in which 15% carbon black having a specific surface of about 900 m$^2$/g is mixed. A 60 μm thick top layer 42, as indicated in Example 1 of European patent application EP-A-0 146 980, is disposed on this layer.

Figure 3:
FIG. 3 is a diagram showing the layer structure of another embodiment of an intermediate belt.

In the embodiment shown in FIG. 3, the support is in the form of an endless belt 41 consisting mainly of an impurity-absorbent material. A top layer 42 is disposed on the support.

In the configuration of FIG. 1 the intermediate belt 12 used can have a layer structure according to FIG. 3 wherein the support layer 41 consists mainly of a material capable of absorbing the impurities reversibly. The intermediate belt 12 is trained around drive and guide shafts or rollers 14, 15. One or more of the rollers 14, 15 is provided with a layer of peroxide hardened silicone rubber in which 15% carbon black having a specific surface of about 900 m$^2$/g is mixed. Additionally, a cleaning device in the form of a roller 26 covered with an impurity-absorbing material can be positioned between the drive and guide shafts. This impurity-absorbing material preferably irreversibly absorbs the impurities so that carry back of the impurities to the support layer of the intermediate belt is prevented. The cleaning device or the rollers 14, 15 can be heated to increase the absorption speed. The support layer 41 can be fiber enforced to ensure long-term mechanical stability.

The choice of specific absorbent material depends on the type of impurity, the maximum amount of impurity which can be absorbed in the absorbent material, i.e. the absorption capacity, and the speed at which the impurity is absorbed in this material, i.e. the absorption speed. The absorption capacity and the absorption speed of a specific impurity can easily be determined by bringing such impurity into contact, in solid, liquid or dissolved form, with absorbent material and monitoring the increase in weight of such absorbent material in the course of time.

A model compound having an affinity comparable to that of the impurity for the top layer 42 of the intermediate can also be used as an impurity. The absorption capacity for the low-melting impurities from alkaline papers is determined, for example, by bringing the absorbent material into contact, at about 100° C., for 24 hours, with distearyl ketone, a dialkyl ketone compound, and measuring the increase in weight. The absorption capacity of various materials is given in Table 1.

TABLE 1

| MATERIAL | ABSORPTION CAPACITY (% weight increase of the rubber) |
|---|---|
| Addition-hardened silicone rubber LIM 2600 (General Electric Co) | 4.4 |
| Peroxide-hardened silicone rubber (Wacker R300-50) | 3.6 |
| EPDM Rubber (ethylene-propylene ratio 40:60) | 65.0 |
| Ethylene propylene rubber | 62.0 |
| Ethylene vinyl acetate rubber | 121.0 |
| EPDM/silicone blend (Shin Etsu 1411) | 68.0 |
| Silicone rubber mixed with 43% graphite (specific surface graphite = 15 m²/g) | 4.0 |
| Silicone rubber mixed with 6% carbon black with specific surface 265 m²/g | 7.0 |
| Silicone rubber mixed with 5% carbon black with specific surface 900 m²/g | 9.8 |
| Silicone rubber mixed with 12% carbon black | 10.7 |
| Methyl phenyl silicone rubber | <0.6 |
| Fluorosilicone rubber (General Electric FSE 2120) | 0.6 |
| n-butyl rubber | 61.0 |

In practice it has been found that materials which can absorb distearyl ketone to more than 5% of their own weight are very suitable as absorbent material on the cleaning means. Reasonably good results are obtained with aliphatic rubbers, preferably from the group consisting of ethylene propylene diene rubber, ethylene propylene rubber, ethylene vinyl acetate rubber, and ethylene propylene diene rubber/silicone rubber blend, and halogenated or non-halogenated n-butyl rubber. Rubber materials which are compounded with more than 5% and preferably more than 10% highly structured carbon black are preferred.

Examples of usable rubber materials are the above rubbers and condensation, peroxide and addition-hardened silicone rubbers. Suitable carbon blacks have a high specific surface, i.e. higher than 200 m²/g and preferably higher than 500 m²/g. Rubber materials which are compounded with such carbon blacks have sufficient absorption capacity and an absorption speed which is much higher (more than ten times as high) than with the previously mentioned rubbers. Furthermore, carry-back to the top layer of the intermediate is obviated by the use of such materials.

A rubber material having very good properties with respect to the absorption capacity for impurities consists mainly of silicone rubber obtained by the reaction of an Si—H—group bearing polyorganosiloxane with a polyorganosiloxane which bears Si—(CH=CH$_2$) groups and which on average per polymeric chain contains no more than 1000 monomeric units, bears 1.5–4 terminal vinyl groups, bears no more than one non-terminal vinyl group per 80 monomeric units and contains not more than 2% Si atoms in the form of SIO3/2 or SIO4/2 units, which rubber is mixed with at least 10% carbon black having a specific surface greater than 200 m²/g.

The silicone rubber used here is an addition-hardened RTV rubber derived from an Si—(CH=CH$_2$) group bearing polyorganosiloxane (hereinafter referred to as the V-component), which has the above-defined characteristics. Preferably, a V-component is used which contains on average two terminal vinyl groups per polymeric chain. Also after the incorporation of carbon black these silicone rubbers have very good mechanical properties and adhere excellently to the fabric and the top layer. Very suitable are V-components which contain from none to not more than 2% Si-atoms in the form of SiO3/2 or SIO4/2 units and which satisfy the general formula:

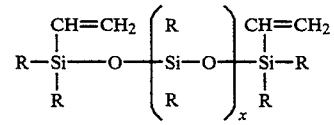

where R denotes the conventional organic radical (or radicals) in polyorganosiloxanes, such as an alkyl group, more particularly a methyl group, and X is a number between 100 and 450, more particularly between 250 and 350. Polyorganosiloxanes according to the above general formula are linear products which can be prepared easily and reproducibly.

The reactive Si—H group-bearing component (hereinafter referred to as the H-component) is selected from the H- components known for RTV rubber production. Preferably, the H-component used contains between 6000 and 11000 mmol/kg reactive hydrogen groups.

The silicone rubber is obtained by mixing the V-component with the H component, in the presence of a suitable reaction catalyst, such as a platinum catalyst known for this purpose, and applying the homogeneous mixture in the required layer thickness to a suitable support or substrate. The ratio between the V and H component is so selected as to give an excess of reactive Si—H groups with respect to Si—(CH=CH$_2$) groups. Preferably, the excess of reactive Si—H groups is at least 40% and more particularly more than 100%. Particularly preferred in these conditions is a silicone rubber prepared with an H-component of the average ratio formula where $(SIO4/2)_n$—$(SiO1/2(CH_3)_2H)_m$ where n:m is between 1:0.67 and 1:4. Rubbers prepared on the basis of this H-component are easy to produce, can be readily adjusted for required hardness, and have excellent processing properties.

PREFERRED EMBODIMENTS

The invention will now be explained with reference to the following examples which are intended to illustrate, but not limit, the scope of the present invention.

EXAMPLE 1

A 100 mm thick metal cylindrical roller was provided with a 1000 μm thick intermediate layer of peroxide hardened silicone rubber in which 12% carbon black had been incorporated and provided with a 70 μm thick top layer as described in Example 8 of UK patent 1 279 687.

After 200,000 copies on alkaline paper there was no soiling of the image-forming medium. Using a 1000 μm thick intermediate layer of silicone rubber of type 200/201 made by Messrs Possehl, Germany, serious soiling of the image-forming medium occurred after just a few tens of thousands of copies.

EXAMPLE 2

A fabric belt woven from Nomex yarn was provided with a 1000 μm thick layer of an EPDM-rubber/silicone belt (Shin Etsu 1411) and provided with a 70 μm thick top layer in accordance with Example 1. Slight soiling of the image-forming medium occurred after 150,000 copies.

EXAMPLE 3

A 165 mm thick metal cylindrical roller was provided with an approximately 1 μm thick layer of silicone rubber applied by coating with a liquid of the following composition:

| | |
|---|---|
| 100 g | of the V-component described hereinafter |
| 1.9 g | of an H-component as described in EP-A-0 349 072 having the average formula $((CH_3)_3SiO1/2)$—$((CH_3)_2SiO2/2)_{9.5}$—$(H(CH_3)SiO2/2)_{19}$—$((CH_3)_3SiO1/2)$ |
| 40 ppm | of a conventional platinum catalyst |
| 300 ppm | 1-ethyl-1-cyclohexanol (inhibitor) |
| 15 g | carbon black having a specific surface of about 900 m²/g. |

The layer formed was hardened (to 40° ShA) by keeping the roller at a temperature of about 120° C. for about 20 hours. The roller was then provided with a top layer as described in Example 8 of UK patent 1 279 687. The fixing means thus obtained was used in a copier of the Oce 1850 type, in which a powder image was formed on a photo-conductive image recording element, this powder image was transferred by application of pressure to the rubber surface of the heated fixing means, and finally the softened image was transferred to a paper sheet pressed against the fixing means in a pressure zone. No soiling occurred after 300,000 copies.

Preparation of V-Component

A mixture of:

| | |
|---|---|
| 532 g | octamethyl cyclotetrasiloxane and |
| 5.1 g | divinyl tetramethyl disiloxane was heated with agitation to ± 85° C., after which there was added: |
| 0.1 g | tetramethyl ammonium hydroxide. |

The reaction mixture was agitated at ±85° C. until there was no further increase in viscosity. This situation was reached after about 1 ½ hours. The reaction mixture was then kept at 150° C. with agitation for 1 hour and then heated to 170° C. It was then distilled in vacuo until all the volatile constituents had left the reaction mixture. The residue was then filtered.

The V-component obtained had the average formula: $((CH_3)_2(CH=CH_2)SiO1/2)$—$((CH_3)_2SiO2/2)_{180}$—$((CH_3)_2(CH=CH_2)SiO1/2)$ The quantity of $Si$—$(CH=CH_2)$ groups in the product was 120 mmol/kg.

EXAMPLE 4

A fixing means was prepared in the manner described in Example 3, the silicone rubber being formed by means of a liquid of the following composition:

| | |
|---|---|
| 100 g | V-component in accordance with Example 3 |
| 2.1 g | H-component having the ratio formula $(SiO4/2)_{10}$—$(SiO1/2(CH_3)_2H)_{24}$ |
| 20 ppm | platinum catalyst |
| 300 ppm | 1-ethynyl-1-cyclohexanol |
| 15 g | carbon. |

The final rubber had a hardness of 45° ShA.

After 500,000 copies there was no deposition of impurities. The H-component used was prepared by dropping 36.3 ml of concentrated hydrochloric acid into a solution of 51.3g tetraethoxy silane and 50g dimethyl chlorohydrosilane in 250 ml methylene chloride, at a temperature of between 5 and 30 C. The reaction mixture was then agitated for 3 hours at the same temperature and then poured into water. Further processing was as described in Example 3. The H-component contained 10,400 mmol/kg reactive Si-H groups.

The present invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An electrostatic imaging apparatus comprising:
   an image-forming medium having a toner image developed thereon,
   an endless movable intermediate transfer medium comprising a support provided with a top layer which is secured via its back to said support, which intermediate transfer medium in a first transfer zone is in contact with said image-forming medium,
   means for transferring said toner image from said image-forming medium to said intermediate transfer medium,
   heating means for heating said toner image on said top layer of said intermediate transfer medium,
   a pressure applying means which, in a second transfer zone, is brought into contact with said intermediate transfer medium, to transfer said toner image from said intermediate transfer medium to a toner image receiving material, and
   transport means for transporting said toner image receiving material through said second transfer zone, said intermediate transfer medium comprising an impurity-absorbent material of removing from said top layer of said intermediate transfer medium via a back thereof impurities which have been transferred to said top layer of said intermediate transfer medium from said toner image receiving material.

2. An apparatus according to claim 1, wherein said impurity-absorbent material comprises an intermediate layer applied to said support of said intermediate transfer medium beneath said top layer of said intermediate transfer medium.

3. An apparatus according to claim 2, wherein said impurity-absorbent material comprises a rubber material.

4. An apparatus according to claim 3, wherein said intermediate transfer medium is in the form of an endless belt trained about two or more shafts and said support is comprised of a fabric belt, which fabric belt is provided with a layer of said impurity-absorbent rubber material.

5. An apparatus according to claim 1, wherein said intermediate transfer medium is in the form of an endless belt which is trained about two or more shafts and said support thereof comprises an impurity-absorbent rubber material.

6. An apparatus according to claim 1, wherein said impurity-absorbent support on its side facing away from said top layer is contacted with a cleaning device which is provided with a layer of an impurity-absorbent material.

7. An apparatus according to claim 5, wherein one or more of said shafts is covered with a layer of impurity-absorbent material.

8. An apparatus according to claim 1, wherein said impurity-absorbent material can absorb distearyl ketone in an amount of at least 5% of its weight.

9. An apparatus according to claim 8, wherein said impurity-absorbent material is selected from the group consisting of ethylene propylene diene rubber, ethylene propylene rubber, a mixture of ethylene propylene diene rubber and silicone rubber, ethylene vinyl acetate rubber, n-butyl rubber and mixtures of these rubbers.

10. An apparatus according to claim 8, wherein said impurity-absorbent material comprises a rubber material in which at least 5% carbon black is mixed, said rubber material being selected from the group consisting of ethylene propylene diene rubber, ethylene propylene rubber, ethylene vinyl acetate rubber, n-butyl rubber, silicone rubber and mixtures of these rubbers.

11. An apparatus according to claim 8, wherein said impurity-absorbent material is a rubber material in which at least 10% carbon black is mixed.

12. An apparatus according to claim 8, wherein said impurity-absorbent material consists of a silicone rubber obtained by a reaction of a Si—H—group bearing polyorganosiloxane with a ppolyorganosiloxane which bears Si—(CH=CH$_2$) groups and which on average per polymeric chain contains no more than 1000 monomeric units, bears 1.5–4 terminal vinyl groups, bears no more than one non-terminal vinyl group per 80 monomeric units and contains not more than 2% Si atoms in the form of SiO3/2 or SiO4/2 units, which rubber is mixed with at least 10% carbon black having a specific surface of at least 200 m$^2$/ g.

13. An apparatus according to claim 12, wherein said Si—H—group bearing polyorganosiloxane consists of a polyorganosiloxane have an average ratio formula (SiO4/2)$_n$—(SiO1/2)CH$_3$)2H)$_m$ where n:m is between 1:0.67 and 1:4.

14. An apparatus according to claims 10 or 11, wherein said mixed-in carbon black has a specific surface of more than 200 m$^2$/g.

15. An apparatus according to any one of claims 10 to 11, wherein said mixed-in carbon black has a specific surface of at least 500 m$^2$/g.

* * * * *